(12) United States Patent
Lee

(10) Patent No.: US 7,499,732 B2
(45) Date of Patent: Mar. 3, 2009

(54) APPARATUS AND METHOD FOR SAVING POWER OF A MOBILE COMMUNICATION TERMINAL

(75) Inventor: Yong-Hwan Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 243 days.

(21) Appl. No.: 11/113,787

(22) Filed: Apr. 25, 2005

(65) Prior Publication Data

US 2006/0019722 A1 Jan. 26, 2006

(30) Foreign Application Priority Data

Jul. 21, 2004 (KR) .................. 10-2004-0056879

(51) Int. Cl.
*H04B 1/38* (2006.01)
(52) U.S. Cl. ..................... 455/574; 370/311
(58) Field of Classification Search ............ 455/410, 455/411, 572, 574, 343.1, 343.2, 343.3, 528; 340/825.49; 370/252, 278, 311
See application file for complete search history.

(56) References Cited

U.S. PATENT DOCUMENTS

| | | | | |
|---|---|---|---|---|
| 5,577,046 A | * | 11/1996 | Diachina et al. | 370/252 |
| 5,686,902 A | * | 11/1997 | Reis et al. | 340/825.49 |
| 6,618,586 B2 | * | 9/2003 | Inoue | 455/343.2 |
| 2002/0082060 A1 | * | 6/2002 | Kang et al. | 455/574 |
| 2003/0107475 A1 | * | 6/2003 | Bautista et al. | 340/7.35 |

* cited by examiner

*Primary Examiner*—Sam Bhattacharya
(74) *Attorney, Agent, or Firm*—The Farrell Law Firm, PC

(57) ABSTRACT

An apparatus and a method for saving power of a mobile station (MS). The apparatus includes an RF unit for processing radio signals transmitted between an MS and a BS, and a processor for performing an RX task, a layer 2 task, a main control task, and a searcher task. The RX task receives a message from the BS by controlling the RF unit, determining if an address included in the received message matches an address stored in the MS, transmitting the received message to another task when the address match, and generating a fast sleep command when the address do not match. The layer 2 task transmits the message received from the RX task to another task, the main control task processes the message, and the searcher task shifts the MS to a fast sleep state when receiving the command from the RX task.

12 Claims, 4 Drawing Sheets

Data Burst Message

| Fields | Length(bits) |
|---|---|
| MSG_TYPE('00001001') | 8 |
| ACK_SEQ | 3 |
| MSG_SEQ | 3 |
| ACK_SEQ | 1 |
| VALID_ACK | 1 |
| ADDR_TYPE | 3 |
| ADDR_LEN | 4 |
| ADDRESS | 8 x ADDR_LEN |
| MSG_NUMBER | 8 |
| BURST_TYPE | 6 |
| NUM_MSGS | 8 |
| NUM_FIELDS | 8 |

NUM_FIELDS occurrences of the following field:

| CHARi | 8 |
|---|---|

| RESERVED | 5 |
|---|---|

APPARATUS AND METHOD FOR SAVING POWER OF A MOBILE COMMUNICATION TERMINAL

PRIORITY

This application claims priority to an application entitled "Apparatus and Method for Saving Power of Mobile Communication Terminal" filed in the Korean Intellectual Property Office on Jul. 21, 2004 and assigned Ser. No. 2004-56879, the contents of which are incorporated herein by reference.

BACKGROUND OF THE INVENTION

1. Field of the Invention

The present invention relates generally to an apparatus and a method for saving power of a mobile communication terminal in a mobile communication system, and more particularly to an apparatus and a method for saving power by quickly processing a message.

2. Description of the Related Art

Mobile communication terminals repeat a process of periodically awaking from an idle state according to a slot cycle index, checking their own slots, and then shifting to a sleep state again. For example, when a slot cycle index is 1, a period is 2.56 seconds.

More specifically, mobile communication terminals generally awake at their own slots, receive general page messages, and then sleep or sleep fast. However, sometimes mobile communication terminals receive overhead messages due to the change of base station (BS) information or a sequence. Further, sometimes mobile communication terminals receive Data Burst Messages (DBMs), order messages, Channel Assignment Messages (CAMs), Extended Channel Assignment Messages (ECAMs), etc.

Messages received from a base station (BS) are processed via an RX task, a layer 2 task, and a main control layer. In a mobile communication terminal, the RX task generates a 20 ms interrupt for the messages received from a base station (BS) and then transfers the interrupted message to an upper layer. When a paging channel data rate is 9600 bps, a 20 ms frame has a size of 192 bits and this frame is sent to an upper layer for processing.

Theoretically, the slot of a paging channel has a unit of 80 ms and a mobile communication terminal awakes for 80 ms slot. However, actually considering a period of time for which the mobile communication terminal awakes and prepares to sleep, the mobile communication terminal awakes for about 95 ms. Accordingly, when a slot cycle index is 1, the mobile communication terminal awakes for 95 ms every 2.56 seconds. This is associated with the battery consumption of the mobile communication terminal. That is, when the mobile communication terminal is awake for a long time, the battery consumption increases.

Typically, a mobile communication terminal receives many data burst messages, i.e., short message service (SMS) messages, through a traffic channel. The data burst message includes a data burst message (general data burst message) having a general address and a data burst message (broadcast data burst message) having a broadcast address. The former is received through a point-to-point scheme and the latter is received through a broadcast scheme. The general data burst message or the broadcast data burst message as described above is discarded or processed according to agreement or disagreement of an address. Herein, the agreement of an address means that an Electronic Serial Number (ESN)/phone number or a broadcast address of a mobile communication terminal included in a message transmitted from a base station (BS) is identical to those stored in a mobile communication terminal receiving the message. This enables the mobile communication terminal to recognize if the message transmitted from the base station is directed to the mobile communication terminal itself.

In the Republic of Korea, a typical SMS message capable of being transmitted by a general user once has a limited size of 80 bytes. Further, because a broadcast SMS message is also used when a base station (BS) provides a mobile communication terminal with information, the broadcast SMS message is generally transmitted after 80 bytes are completely filled with contents. Herein, when a mobile communication terminal receives a data burst message having such a size in an idle state, a layer 2 of the mobile communication terminal discards the data burst message by reason of the disagreement of an address. Because a message such as an ECAM/CAM and a command has a small size, the message may be processed in one frame. However, because the data burst message has a large size, unnecessary overhead occurs in an RX task and the layer 2 and a time point at which the mobile communication terminal enters a sleep state is also delayed. Therefore, the battery power is wasted.

More specifically, when a paging channel data rate is 9600 bps, a mobile communication terminal sends a message with 192 bits each time to the layer 2 task about six times. Then, all the sent bits are reassembled and whether their addresses agree with each other or not is examined. As a result of the examination, the mobile communication terminal discards the message when the message does not target the mobile communication terminal itself.

Accordingly, when an RX task generates many frames and sends the frames to a layer 2, a mobile communication terminal cannot process the frames while it awakes only for one slot. Further, under the environments of reception of many data burst messages, even though the mobile communication terminal is in an idle state, the power of the mobile communication terminal is greatly consumed.

SUMMARY OF THE INVENTION

Accordingly, the present invention has been made to solve the above and other problems occurring in the prior art. It is an object of the present invention to provide an apparatus and a method for saving power of a mobile communication terminal through a quick processing of a message.

It is another object of the present invention to provide an apparatus and a method for saving power of a mobile communication terminal through a quick processing of a data burst message.

In accordance with one aspect of the present invention, there is provided an apparatus for saving power of a mobile communication terminal. The apparatus includes: a radio frequency (RF) unit for processing radio signals transmitted from a mobile communication terminal to a base station (BS) or radio signals transmitted from the base station (BS) to the mobile communication terminal; and a processor for performing an RX task, a layer 2 task, a main control task, and a searcher task, the RX task receiving a message from the base station (BS) by controlling the RF unit, checking if an address included in the received message is identical to an address stored in the mobile communication terminal, transmitting the received message to another task when the two address are identical to each other, and generating a fast sleep command when the two address are not identical to each other, the layer 2 task transmitting the message received from the RX task to another task, the main control task processing the message received from the layer 2 task, and the searcher task enabling the mobile communication terminal to shift to a fast sleep state when receiving the fast sleep command from the RX task.

In accordance with another aspect of the present invention, there is provided a method for saving power of a mobile communication terminal. The method includes the steps of: receiving a message by an RX task from a base station (BS); determining if an address included in the received message is identical to an address stored in the mobile communication terminal; and enabling, by the RX task, the mobile communication terminal to shift to a fast sleep state without transmitting the received message to an upper task when the two addresses are not identical to each other.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
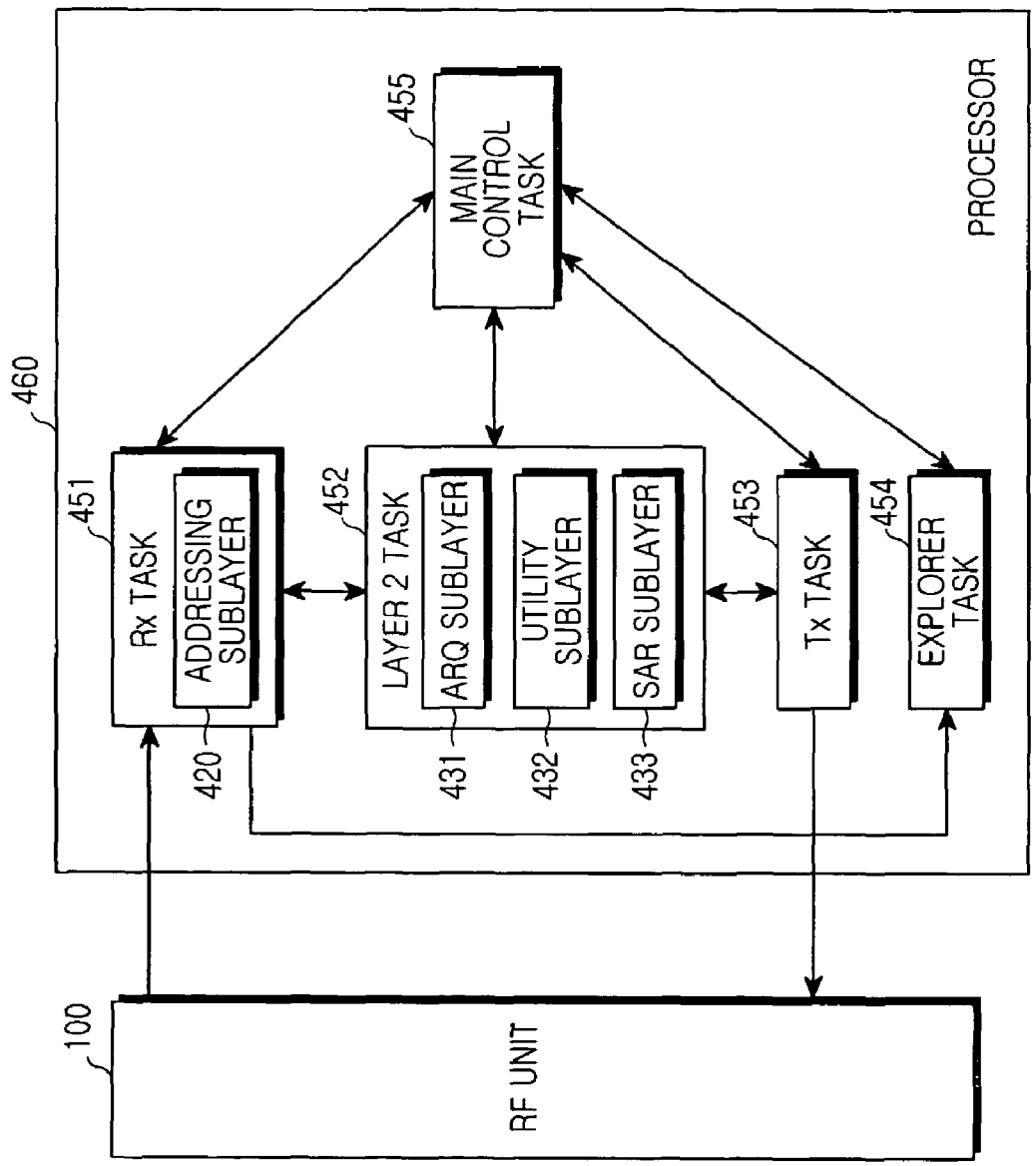
FIG. 1 is a block diagram of apparatus for saving power of a mobile communication terminal according to a preferred embodiment of the present invention.

Preferred embodiments of the present invention will be described in detail herein below with reference to the accompanying drawings. In the drawings, the same reference numerals are used to designate the same elements as those shown in other drawings.

Additionally, in the description below, many particular items such as detailed length of a frame are shown, but these are provided for helping the general understanding of the present invention. It will be understood by those skilled in the art that the present invention can be embodied without particular items. Further, in the following description of the present invention, a detailed description of known functions and configuration incorporated herein will be omitted when it may obscure the subject matter of the present invention.

For a conventional data burst message, an RX task checks an address type ADDR_TYPE, an address length ADDR_LEN, etc., of the message in a first 20 ms frame. When the checked address type and address length are not identical to those stored in the mobile communication terminal, the RX task sends a fast sleep command to a searcher task. Further, for a broadcast data burst message, when the mobile communication terminal does not support a Common Broadcasting Service (CBS), the RX task enables the mobile communication terminal to sleep fast.

However, even though the mobile communication terminal supports the CBS, the RX task checks agreement or disagreement of a broadcast address. More specifically, it may be a field of a broadcast address such as a message ID and a category list. When the broadcast address is not identical to that stored in the mobile communication terminal, the RX task enables the mobile communication terminal to sleep fast. Accordingly, a process in which the RX task sends a 20 ms interrupt to a layer 2 several times is skipped, such that the decrease of a period of time for which the mobile communication terminal is awake can be above 150 ms.

Herein, even though an incoming call is received at a predetermined time after the mobile communication terminal has shifted to a sleep state, there is no problem because the mobile communication terminal can receive a conventional paging message of the incoming call the next time it awakes. Further, this case rarely occurs.

FIG. 1 is a block diagram of apparatus for saving power of a mobile communication terminal according to a preferred embodiment of the present invention. Referring to FIG. 1, a Radio Frequency (RF) unit 100 processes radio signals transmitted from the mobile communication terminal to a base station (BS) and vice versa. A processor 460 performs an RX task 451, a layer 2 task 452, a TX task 453, a searcher task 454, and a main control task 455. The RX task 451 controls the RF unit 100 to receive a message from the BS, and checks a message type and an address type. As a result of the checking, when the message type and the address type are identical to those stored in the mobile communication terminal, the RX task 451 sends the received message to another task.

However, when the message type and the address type are not identical to those stored in the mobile communication terminal, the RX task 451 generates a fast sleep command. To accomplish this, the RX task 451 includes an addressing sublayer 420. The addressing sublayer 420 is a layer for determining if the message received from the BS is identical to a message received in the current mobile communication terminal, receiving the message when the two messages are identical to each other, or ignoring the message when the two messages are not identical to each other.

Further, the addressing sublayer 420 is a layer for inserting the address (ESN/phone number) of the current mobile communication terminal into a field value and transmitting the field value.

The layer 2 task 452 sends the message received from the RX task 451 to another task. An ARQ sublayer 431 of the layer 2 task 452 is a layer for sequentially sending signaling messages of a base station (BS) and a mobile communication terminal. A utility sublayer 432 of the layer 2 task 452 unpacks the values of all fields in order to perform various functions necessary for the layer 2. A Segmentation And Reassembly (SAR) sublayer 433 of the layer 2 task 452 reassembles each frame received from the RX task 451 or segments messages received from an upper layer and transmitting the segmented messages to the RX task 451.

The searcher task 454 receives the fast sleep command from the RX task 451 and enables the mobile communication terminal to shift to a fast sleep state.

The main control task 455 processes the message received from the layer 2 task 452. When the mobile communication terminal has joined in a CBS, supports a broadcasting service, and there is agreement of a broadcast address, the main control task 455 also plays a role of sending a broadcast data burst message to an upper layer (layer 3, application).

Further, the main control task 455 also controls general control for the specific operation of the mobile communication terminal.

The TX task 453 controls the RF unit 100 to transmit a message to a BS. Various tasks, such as database tasks, user interface tasks, etc., are not shown and a description about the tasks will be omitted because they are not directly related to the subject matter of the present invention.

In the conventional case, when a message is received, the message is always sent up to a layer 2 regardless of whether or not a mobile communication terminal supports a CBS and agreement or disagreement of a broadcast address. However, in the present invention, an addressing sublayer in the Rx task is substituted for an addressing sublayer in a conventional layer 2. and determines if a message is sent to a layer 2, such that unnecessary overhead can be eliminated and entering a sleep state can be accelerated. Consequently, battery consumption can be reduced.

Figure 2:
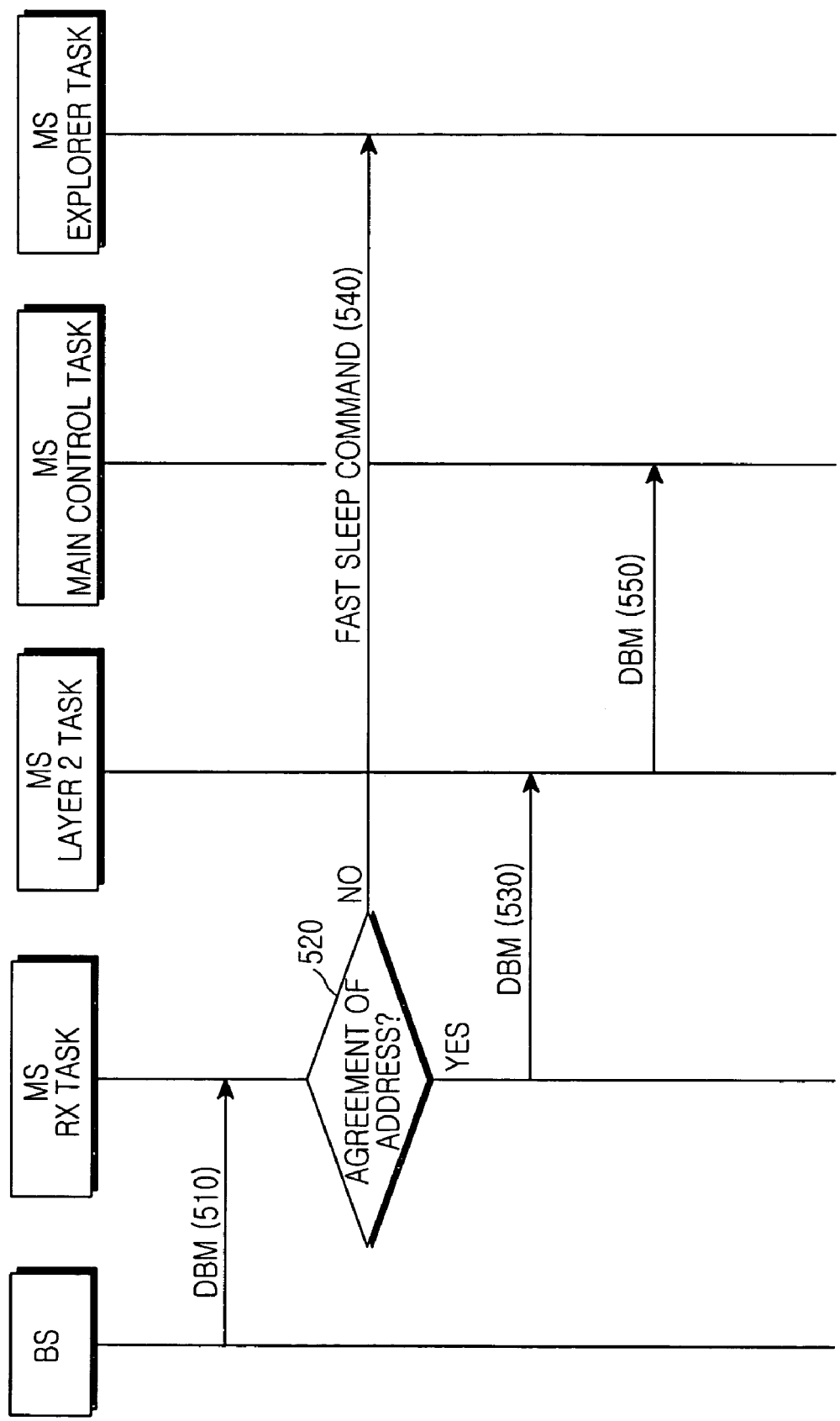
FIG. 2 is a ladder diagram illustrating a transmission process of a data burst message according to a preferred embodiment of the present invention.

FIG. 2 is a ladder diagram illustrating a transmission process of a data burst message according to a preferred embodiment of the present invention. Referring to FIG. 2, it is assumed that a BS transmits a message, e.g., a data burst message, to the RX task of a mobile communication terminal in step 510. The RX task of the mobile communication terminal in an idle state receives the message and checks agreement or disagreement of an address, i.e., if the message is destined to be transmitted to the mobile communication terminal, in step 520. As indicated above, the agreement or disagreement of the address means that an ESN/phone number included in the received message is identical or not identical to that stored in the mobile communication terminal when the received is a general data burst message. Further, when the received message is a broadcast data burst message, the agreement or disagreement of the address means that a broadcast address included in the received message is identical or not identical to that stored in the mobile communication terminal.

As a result of the checking, when there is the agreement of the address, the RX task sends the received message to another task, i.e., a layer 2 task, in step 530. However, when there is the disagreement of the address, the RX task generates a fast sleep command in step 540. The searcher task receives the fast sleep command from the RX task and allows the mobile communication terminal to shift to a fast sleep state. The layer 2 task sends the message received from the RX task to the main control task, and the main control task processes the message received from the layer 2 task.

Figure 3:
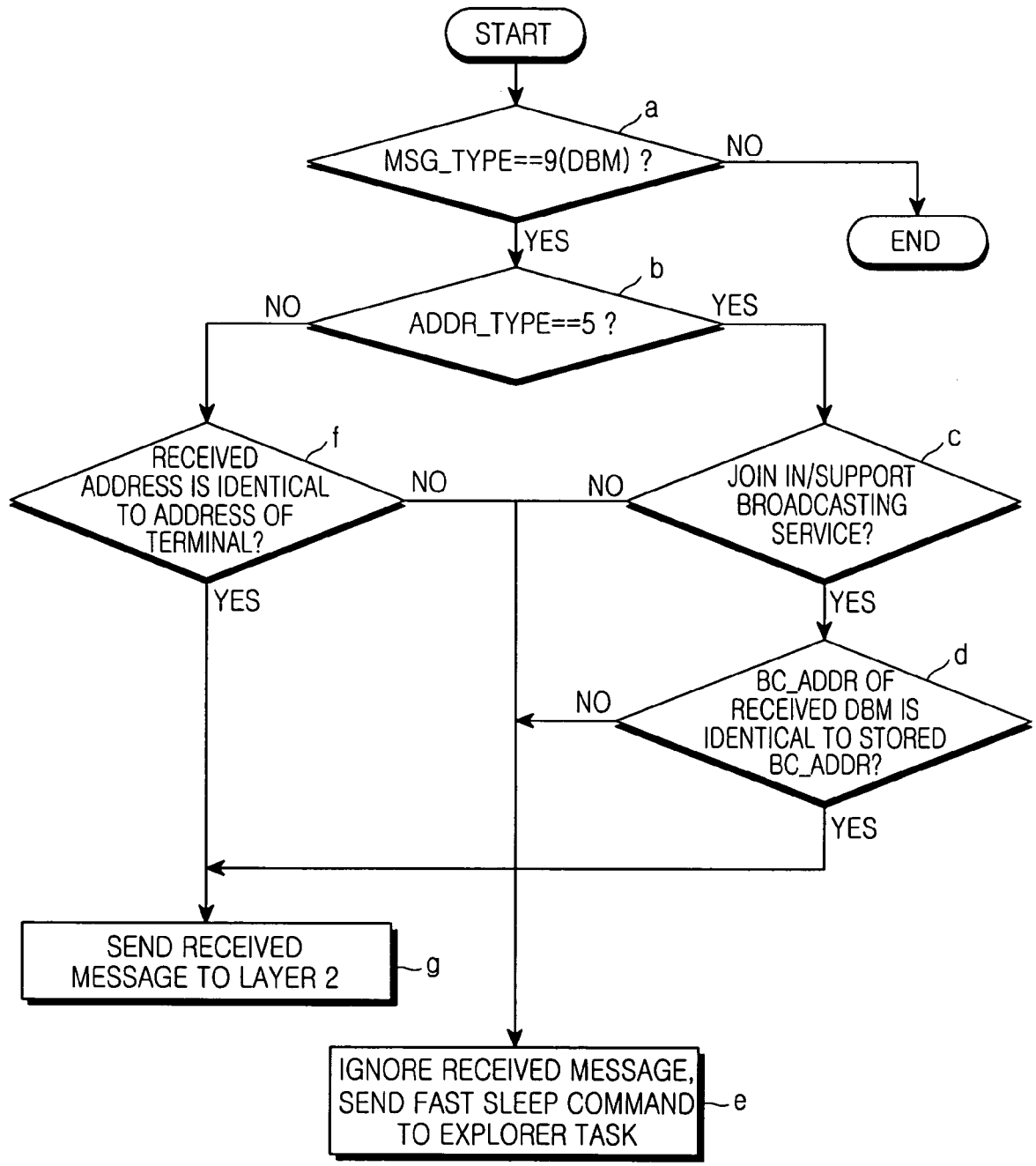
FIG. 3 is a flow diagram illustrating a method for saving power in a course of transmitting a data burst message from an RX task of a mobile communication terminal according to a preferred embodiment of the present invention.

FIG. 3 is a flow diagram illustrating a method for saving power while transmitting a data burst message from the RX task of the mobile communication terminal according to a preferred embodiment of the present invention. Referring to FIG. 3, when receiving a message from a base station (BS), the RX task checks a message type MSG_TYPE in step "a" and an address type ADDR_TYPE in step "b". As a result of the checking, when the message type is 9, the message denotes a data burst message. Further, when the address type is 5, the message denotes a data burst message having a broadcast address, that is, a broadcast data burst message.

When the message type of the received message is the broadcast data burst message, the RX task determines if the mobile communication terminal has joined in a broadcasting service and supports the broadcasting service in step "c".

When the mobile communication terminal has joined in the broadcasting service and supports the broadcasting service, the RX task determines if a broadcast address BC_ADDR included in the received data burst message is identical to that stored in the mobile communication terminal in step "d".

When the broadcast address included in the received data burst message is not identical to that stored in the mobile communication terminal, the RX task does not transmit the received data burst message to the layer 2 task, but instead, sends a fast sleep command, which enables the mobile communication terminal to shift to a fast sleep state, to the searcher task in step "e".

However, when it is determined that the broadcast address included in the received data burst message is not identical to that stored in the mobile communication terminal, the RX task transmits the received data burst message to the layer 2 task in step "g".

When it is determined that the received message is not the broadcast data burst message, but the general data burst message in step "b", the RX task determines if an ESN/phone number of a terminal included in the received data burst message is identical to that stored in the mobile communication terminal.

When the ESN/phone number of the terminal included in the received data burst message is not identical to that stored in the mobile communication terminal, step "e" is performed. That is, the RX task does not transmit the received data burst message to the layer 2 task, but instead, sends the fast sleep command, which enables the mobile communication terminal to shift to the fast sleep state, to the searcher task.

However, when the ESN/phone number of a terminal included in the received data burst message is identical to that stored in the mobile communication terminal, step "g" is performed to enable the RX task to transmit the received data burst message to the layer 2 task.

In step "c", when the mobile communication terminal has not joined in the broadcasting service or does not support the broadcasting service, step "e" is performed. That is, the RX task does not transmit the received data burst message to the layer 2 task, but instead sends the fast sleep command, which enables the mobile communication terminal to shift to the fast sleep state, to the searcher task.

Figures 4, 5:
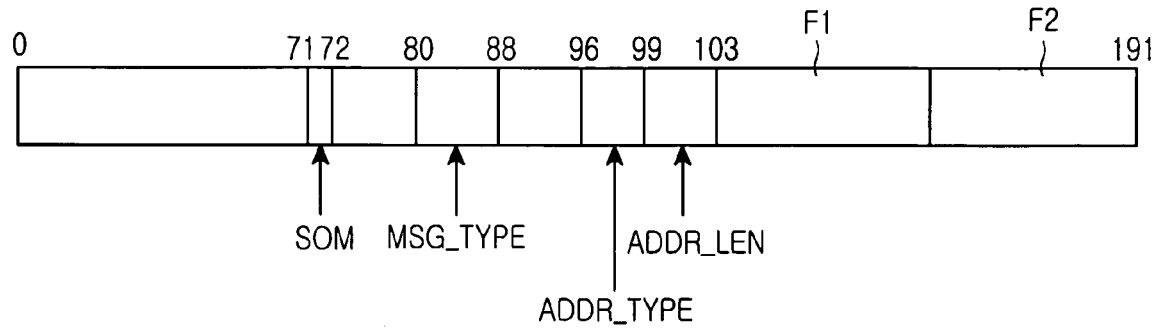
FIG. 4 is a diagram illustrating a 20 ms frame, i.e., 192 bits, transmitted from an RX task of a mobile communication terminal to a layer 2 task according to a preferred embodiment of the present invention.
FIG. 5 is a diagram illustrating an example of a data burst message transmitted from an RX task of a mobile communication terminal to a layer 2 task according to a preferred embodiment of the present invention.

FIG. 4 is a diagram illustrating a 20 ms frame, i.e., 192 bits, transmitted from the RX task of the mobile communication terminal to the layer 2 task according to a preferred embodiment of the present invention. Referring to FIG. 4, the 71 bits from 0 to a $70^{th}$ bit are ignored due to a decoder delay during decoding in the RX task after transmission from a base station (BS) to the mobile communication terminal. Actually, the 71 bits are filled with '0'. The $72^{nd}$ bit is a Start Of Message (SOM). When the $72^{nd}$ bit has a value of '1', it represents the start of a message. However, when the $72^{nd}$ bit has a value of '0', it represents the discard of a message.

The 8 bits from a $73^{rd}$ bit to a $80^{th}$ bit represent the entire length of a message. The 8 bits from a $81^{st}$ bit to a $88^{th}$ bit represent a message type MSG_TYPE, i.e., the type of a message, as defined in a layer 2 specification. Herein, a data burst message has a value of '00001001', that is, 9.

The 8 bits from a $89^{th}$ bit to a $96^{th}$ bit represent an ACK SEQ, an MSG_SEG and a VALID_ACK. The 3 bits from a $97^{th}$ bit to a $99^{th}$ bit represent an address type ADDR_TYPE. The address type ADDR_TYPE represents an item, i.e., an ESN, a phone number, a broadcast address, of an address to be checked in the step 520 of FIG. 2 or step "b" of FIG. 3.

For example, when agreement of a phone number is used, 0 may be assigned to an ADDR_TYPE, 5 (40 bits) may be assigned to an ADDR_LEN, and 40 bits (e.g., 016-xxx-xxxx) may be assigned to an address portion.

The 4 bits from a $100^{th}$ bit to a $103^{rd}$ bit represent an address length ADDR_LEN. Bits from a $104^{th}$ bit to an address length×8 represent an actual address field F1. Herein, this field F1 may include a message ID, a service ID, etc. The other field F2 includes actual data such as stock, weather, etc.

Because the BS transmits a first frame including a data burst message, the mobile communication terminal receives the first frame. Then, the mobile communication terminal can inspect the address type and directly determine whether to shift to a sleep state or not.

FIG. 5 is a diagram illustrating an example of a data burst message transmitted from the RX task of the mobile communication terminal to the layer 2 task according to a preferred embodiment of the present invention. Because the construction as illustrated in FIG. 5 is made known and may refer to 3GPP2 C.S0005-0 version 3.0, 3.7, 2.3, 2.9 Data Burst Message, a detailed description about each field and the length of each field will be omitted.

As described above, in the present invention, power consumption and overload of a mobile communication terminal can be reduced during the reception of a message having disagreement of an address and processing of the message.

For example, usually a mobile communication terminal may receive data burst messages, in which disagreement of an address has occurred, more than once or twice in one minute. In addition, broadcast data burst messages may also be received in the mobile communication terminal by the similar number of times. When it is assumed that about three data burst messages are received for one minute and period of time for which the mobile communication terminal is awake in order to receive one data burst message is about 160 ms, period of time for which the mobile communication terminal awakes is 0.5 second (160 ms×3) in one minute.

For example, the mobile communication terminal awakes for 50 seconds in 100 minutes. As described above, in the present invention, an RX task checks a data burst message having disagreement of an address, and enables a mobile communication terminal to shift to a fast sleep state instead of transmitting the data burst message to a layer 2 task. Therefore, period of time more than 10 minutes in a day can be saved.

Although preferred embodiments of the present invention have been described for illustrative purposes, those skilled in the art will appreciate that various modifications, additions, and substitutions are possible, without departing from the scope and spirit of the present invention as disclosed in the accompanying claims, including the full scope of equivalents thereof.

What is claimed is:

1. An apparatus for saving power in a mobile communication terminal with an accelerated sleep state, the apparatus comprising:
    a radio frequency (RF) unit for processing radio signals transmitted between a mobile communication terminal and a base station; and
    a processor for performing an RX task, a layer 2 task, a main control task and a searcher task,
    wherein the RX task includes receiving a message from the base station by controlling the RF unit, determining if an address included in the received message is identical to an address stored in the mobile communication terminal, transmitting the received message when the two addresses are identical to each other, and generating a fast sleep command when the two addresses are not identical to each other,
    the layer 2 task includes transmitting the message received from the RX task,
    the main control task includes processing the message received from the layer 2 task, and
    the searcher task includes enabling the mobile communication terminal to shift to a fast sleep state when receiving the fast sleep command from the RX task wherein the RX task includes an addressing sublayer and wherein the addressing sublayer in the RX task is substituted for an addressing sublayer in layer 2 to accelerate entering a sleep state.

2. The apparatus in claim 1, wherein the message includes a data burst message.

3. The apparatus in claim 1, wherein the RX task compares a broadcast address included in the received message with a broadcast address stored in the mobile communication terminal and determines if the two broadcast addresses are identical to each other, when the received message is a broadcast data burst message.

4. The apparatus in claim 1, wherein the RX task determines if the received message is a data burst message by checking a message type of the received message, and determines if the received message is one of a general data burst message and a broadcast data burst message by checking an address type of the received message.

5. The apparatus in claim 1, wherein the RX task compares an at least one of electronic serial number (ESN) and a phone number included in the received message with an ESN and a phone number stored in the mobile communication terminal, and determines if the at least one of the ESN and the phone number included in the received message is identical to the ESN and the phone number stored in the mobile communication terminal, when the received message is a general data burst message.

6. A method for saving power of a mobile communication terminal with an accelerated sleep state, the method comprising the steps of:
    receiving a message by an RX task from a base station;
    determining if an address included in the received message is identical to an address stored in the mobile communication terminal; and
    shifting the mobile communication terminal to a fast sleep state without transmitting the received message to an upper task when the two addresses are not identical to each other wherein the RX task includes an addressing sublayer and wherein the addressing sublayer in the RX task is substituted for an addressing sublayer in layer 2 to accelerate entering a sleep state.

7. The method in claim 6, wherein the step of determining if the address included in the received message is identical to the address stored in the mobile communication terminal comprises a step of:
    when the received message is a broadcast data burst message, determining if a broadcast address included in the received broadcast data burst message is identical to a broadcast address stored in the mobile communication terminal.

8. The method in claim 6, wherein the step of determining if the address included in the received message is identical to the address stored in the mobile communication terminal comprises the step of:
    when the received message is a general data burst message, determining if at least one of an electronic serial number (ESN) and a phone number included in the received general data burst message is identical to an ESN and a phone number stored in the mobile communication terminal.

9. The method in claim 6, further comprising the steps of:
    determining if the received message is a data burst message; and determining if the received message is a broadcast data burst message, when the received message is the data burst message.

10. The method in claim 9, further comprising a step of determining if the mobile communication terminal has joined in a broadcasting service and supports the broadcasting service, when the received message is a broadcast data burst message.

11. The method in claim 10, further comprising a step of ordering by the RX task a searcher task to enable the mobile communication terminal to shift to a fast sleep state without transmitting the received data burst message to a layer 2 task, when the mobile communication terminal has not joined in the broadcasting service and does not support the broadcasting service.

12. The method in claim 6, further comprising a step of transmitting the received message to an upper task, when the address included in the received message is identical to the address stored in the mobile communication terminal.

* * * * *